United States Patent
Michaelis et al.

(10) Patent No.: US 9,215,316 B1
(45) Date of Patent: Dec. 15, 2015

(54) CALLER IDENTIFICATION AND NOTIFICATION ADJUNCT

(71) Applicant: Avaya Inc., Basking Ridge, NJ (US)

(72) Inventors: Paul Roller Michaelis, Louisville, CO (US); Kurt Haserodt, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/524,899

(22) Filed: Oct. 27, 2014

(51) Int. Cl.
*H04M 1/56* (2006.01)
*H04M 15/06* (2006.01)
*H04M 3/42* (2006.01)

(52) U.S. Cl.
CPC .................. *H04M 3/42042* (2013.01)

(58) Field of Classification Search
CPC .............. H04M 1/57; H04M 2242/22; H04M 3/42042; H04Q 2213/13091; H04Q 2213/13389
USPC ............. 379/142.01, 142.04, 142.05, 142.07, 379/142.14, 142.17
See application file for complete search history.

(56) References Cited

U.S. PATENT DOCUMENTS

| 6,931,007 | B2* | 8/2005 | Jones | 370/392 |
| 7,130,598 | B2* | 10/2006 | Lee et al. | 379/142.07 |
| 2003/0043982 | A1* | 3/2003 | Lee et al. | 379/142.01 |
| 2003/0147518 | A1* | 8/2003 | Albal et al. | 379/207.15 |
| 2004/0260413 | A1* | 12/2004 | Melideo | 700/87 |
| 2005/0249216 | A1* | 11/2005 | Jones | 370/392 |
| 2008/0065410 | A1* | 3/2008 | Bloom et al. | 705/1 |
| 2008/0279177 | A1* | 11/2008 | Shlomot | 370/352 |
| 2009/0168982 | A1* | 7/2009 | Gonder et al. | 379/142.04 |
| 2014/0044017 | A1* | 2/2014 | Haltom | 370/259 |

* cited by examiner

*Primary Examiner* — Binh Tieu
(74) *Attorney, Agent, or Firm* — Sheridan Ross P.C.

(57) ABSTRACT

A method, system, and telephony adjunct are provided that enable a user of a telephony device to receive caller identification information even though the user of the telephony device has one or more special accessibility requirements. The caller identification information is provided to a computational device also in proximity to the user, but separate and distinct from the telephony device, and the computational device is used to present the caller identification information to the user in a format that accommodates the user's one or more special accessibility requirements. Moreover, the computational device is unable to exert control over servers and other components that are facilitating the communication functionality of the telephony device, thereby enhancing overall security of the system.

20 Claims, 9 Drawing Sheets

CALLER IDENTIFICATION AND NOTIFICATION ADJUNCT

FIELD OF THE DISCLOSURE

The present disclosure is generally directed toward communications and more specifically caller identification systems.

BACKGROUND

Most Session Initiation Protocol (SIP)-based desktop telephones fail three fundamental Section 508 accessibility requirements: (1) Caller identification (ID) is not provided in a manner that is accessible to blind users, e.g. by voice [US Code of Federal Regulations, 36 CFR Part 1194.23(e)]; (2) Caller ID is not provided in a manner that is accessible to low-vision users, e.g. very large sans-serif high contrast font, color and background to be user-specified [36 CFR Part 1194.31(b)]; and (3) The visual indication that there is an incoming call is too subtle to attract the attention of deaf users [36 CFR Part 1194.31(c)].

Although these capabilities could be built into the phone itself, it is not economically practical to build a separate "Section 508" series of phones to support the relatively small proportion of people who require those special functions. Nevertheless, manufacturers that have no solution for these problems could be boxed out of contracts with Section 508-sensitive customers that are looking for SIP-to-the-desktop.

A related consideration is that the Communications and Video Accessibility Act of 2010 (CVAA) bars manufacturers and service providers from charging more for 508-compliant versions of products than is charged for non-compliant configurations. An economical SIP accessibility adjunct, usable with standard unmodified SIP phones, is required.

Some SIP soft clients are able to provide caller ID by voice when used in conjunction with text-to-speech screen-reading adjuncts. Some SIP desktop telephones are able to voice-out the caller ID number (but often not the caller ID name). In residential telephony, voice-output Caller ID adjuncts and stroboscopic alerters are known to sit between the telephone and the phone's connection to the network.

The Section 508 regulations contain many accessibility requirements, a few examples of which are discussed above. An important point is that Section 508 does not impose any limits on the cost of the accommodations. By contrast, the recently enacted CVAA requires manufacturers and service providers to satisfy the Section 508 accessibility requirements without having a significant delta between the cost of the compliant and non-compliant versions of the product.

Illustratively, a SIP desktop telephone that does not have an inherent 508-compliant caller ID module is regarded as satisfying the Section 508 requirements outlined above if the phone can be synchronized with a 508-compliant soft client via a shared control mechanism. However, when one takes into account the complexity and cost of this approach it is apparent that this approach would not satisfy the new CVAA requirements. (Note that, in an enterprise environment, the cost of the PC in a PC-based disability accommodation is not a CVAA consideration. This is because non-disabled employees, not just those with a disability, can be expected to have a PC.)

Assistive caller ID adjuncts, similar to those available for blind and deaf users of residential telephony systems, could be built for SIP systems and may, in fact, already exist. However, because additional special-purpose hardware would be required to satisfy the SIP deskphone requirements, it's not clear that this approach would survive a CVAA audit. At a minimum, a manufacturer or service provider would likely be expected to subsidize the cost of those adjuncts.

Accordingly, a need exists for an inexpensive way to satisfy the regulatory requirements in physical desktop telephones that do not have the support embedded within the standard product.

SUMMARY

It is, therefore, one aspect of the present disclosure to provide a mechanism that, in one embodiment, utilizes SIP "parallel forking" to acquire and provide by voice the caller ID information for calls that are directed to the user's desktop telephone.

In some embodiments, the caller ID module resides on a user's desktop computer or other network-connected device, and registers to a SIP server as a SIP device with the same phone number as the user's desktop phone. However, unlike a traditional soft client, the proposed caller ID module would have no support for communication applications, thus making it easier to download and configure. The sole purpose of the proposed caller ID module, in one embodiment, would be to respond appropriately to an incoming call notification and make an appropriate presentation thereof (e.g., a 508-compliant presentation). Another difference between the proposed caller ID module and the caller ID solutions of the prior art is that the proposed caller ID module would have no ability to control or provide instructions to the SIP server or any other networked device, thereby enhancing security of the overall system.

In some embodiments, some or all of the caller ID module may be executed by a processor of a network server which provides the caller ID information and presentation information therefor though a native browser page or application, thus obviating the need for any software installation or configuration on the PC.

In support of users who are blind, the proposed caller ID module would convert the received caller ID information into an appropriate text format and then push the text string to the basic text-to-speech converter that is inherent in most modern operating systems. For example, in a Windows PC, the text would be pushed to the Microsoft Narrator application for presentation by voice through the PC speakers.

For support of users with poor visual acuity, the received caller ID information could be presented in an enlarged high-contrast font on the display of the device. For example, in a Windows PC, the text could be presented appropriately on the screen. In an alternative embodiment, the text could be presented in an enlarged high-contrast font on the display of the device and also presented by voice via the text-to-speech converter.

For users with hearing impairments, incoming call notification could be presented as a highly animated screen pop that could attract a user's attention even if the user was not looking directly at the screen when the call arrived.

The proposed solution utilizes capabilities that are already present in the typical enterprise SIP environment (e.g., parallel forking, desktop PCs, basic text-to-speech software) to provide support for disabled users of standard SIP desktop telephones. With respect to parallel forking, embodiments of the present disclosure may allow for the caller ID information to be sent to someone other than, or in addition to, the user of the client device. For instance, a supervisor of a callee could be provided with caller ID information in addition to having the callee receive the caller ID information. Presentation of the caller ID information to the supervisor may be provided in a specific format to accommodate disabilities that the supervisor may have (if any or different from the callee) or the caller ID information may be provided in a normal representation (e.g., as small font directly on a client device operated by the supervisor).

In some embodiments, the caller ID module may be implemented in conjunction with a network-connected computational device (e.g., PC, laptop, netbook, etc.) having a browser. The browser may be pointed to a unique address on a web server that has the Caller ID information for the user's telephone and information about the user's disability-related display requirements (e.g., spoken Caller ID, large-font display, attention-grabbing animation), thereby allowing the server to push the Caller ID information to the user's browser in a user-specific disability-accommodating format. It should be noted that this approach could allow browser-equipped telephones to satisfy the Section 508 and CVAA regulations without requiring a separate browser-equipped device, such as a PC.

In some embodiments, rather than require a user to log into a system and submit his/her credentials to get the caller ID info for his phone, embodiments of the present disclosure can instead rely on a system administrator to specify where to send the caller ID information (e.g., the IP address of the PC that belongs to a user with a disability and/or the IP address of a PC that belongs to someone who is assisting a user with a disability).

In some embodiments, rather than rely on expensive text-to-speech software or other assistive adjuncts on the client to provide the caller ID information in a disability-specific format, a system administrator could customize how the caller ID information is delivered by the a server implementing some or all of the caller ID module (e.g., the system administrator could provision the server/caller ID module to send voice packets to the PC of a blind user, send a large-font text message to a low-vision user, flash the display of a deaf user to compensate for their inability to hear their phone ringing, etc.).

In some embodiments, a caller identification and notification adjunct executed with a computational device are provided where the computational device generally comprises:

a user interface adapted to present information to a user of the computational device;

a processor adapted to prepare information for presentation to the user via the user interface; and computer memory comprising processor-executable instructions that include:

a caller identification module that passively receives caller identification information for a call directed toward a telephony device being operated by the user simultaneous with the computational device; and an additional notification mechanism that prepares the caller identification information passively received at the caller identification module such that accessibility needs of the user are accommodated by the user interface during presentation of the caller identification information to the user.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous environments where it is desirable to provide hearing and/or vision impaired users with caller ID information. Additional features and functions of the proposed diagnostic tool will be further understood with reference to the attached figures.

Figure 1:
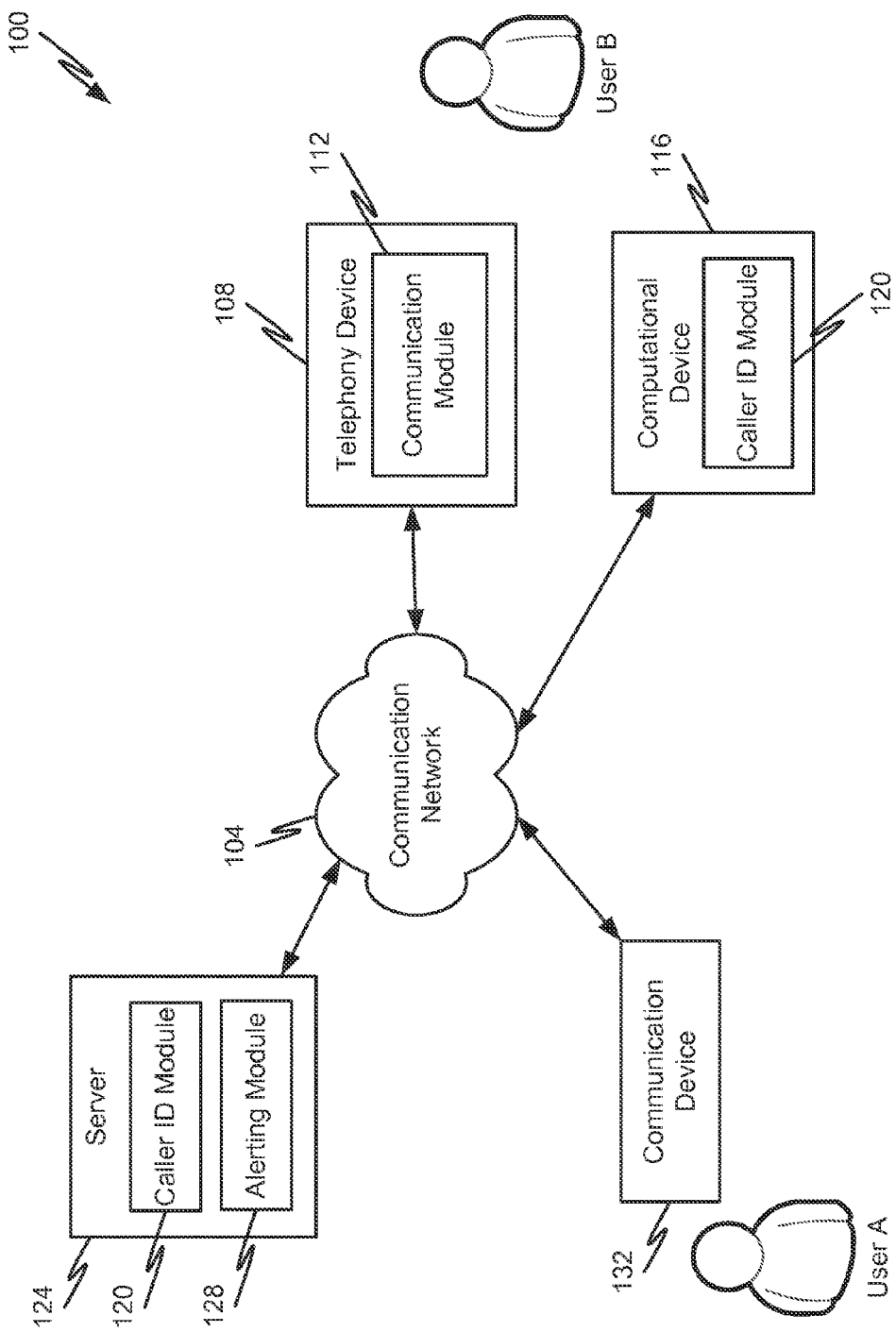
FIG. 1 is block diagram depicting a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more system components (e.g., network devices). In some embodiments, the network 104 provides a communication medium or fabric that enables User A to communication with User B. In some embodiments, User A may be associated with and utilize a communication device 132 whereas User B may be associated with and utilize two devices: a telephony device 108 and a computational device 116. In the example of FIG. 1, User B may correspond to a user that requires or benefits from an alternative presentation of caller ID information. For instance, User B may be hearing impaired, vision impaired, completely deaf, and/or completely blind.

While it is entirely likely that the communication system 100 comprises more than two users, the example of a two-user communication will be utilized for ease of understanding embodiments of the present disclosure. It should be appreciated, however, that the communication system 100 may be configured to support conference calls where more than one user benefits from an alternative presentation of caller ID information as described herein.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The communication device 132 may correspond to a communication endpoint or user device and may be configured for use by one or multiple users. A communication device 132 configured for use by multiple users may be referred to as shared device.

A communication device 132 may correspond to one or multiple communication endpoints utilized by User A to facilitate communications with a telephony device 108 utilized by User B. The computational device 116 employed by User B may be utilized to present caller ID information to User B in such a way that User B can discern and benefit from the presentation of the caller ID information. It should also be appreciated that a server 124 may be involved in at least some communications between the devices operated by User A and User B.

In some embodiments, a communication device 132 may include, without limitation, a telephone, a softphone, a cellular phone, a multi-speaker communication device (e.g., conference phone), a video phone, a PC, a laptop, a tablet, a PDA, a smartphone, a thin client, or the like. It should be appreciated that a communication device 132 may be configured to support single or multi-user interactions with other network-connected devices within an enterprise communication network and/or across multiple communication networks.

The telephony device 108 operated by User B may be different from the communication device 132 in that the primary functionality of the telephony device 108 is to support telephony communications between User B and User A (e.g., to exchange media). As such, the telephony device may have a communication module 112 that enables the communication capabilities of the telephony device 108 (e.g., media exchange, dialing, ringing, answering, conferencing, transferring, etc.). The telephony device 108 may not have the additional applications or processing capabilities of a communication device 132 or a computation device 116 for that matter.

The communication module 112 may enable the telephony device 108 to participate in communication sessions with other client devices 108. Examples of communication sessions enabled by the communication module 112 include, without limitation, voice sessions, video sessions, and the like. The communication module 112 may correspond to dedicated application or it may be incorporated into an operation system of the telephony device 108.

In some embodiments, the server 124 may correspond to one or multiple servers (e.g., a server cluster) that are used to help establish communication sessions, sequence applications, enable communication preferences for users, enforce communication restrictions on users, etc. Specifically, the server 124 may include a Private Branch eXchange (PBX), an enterprise switch, an enterprise server, combinations thereof, or any other type of telecommunications system switch or server. The server 124, in some embodiments, can be configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

The computational device 116 may be utilized by User B as a complimentary device to the telephony device 108. Specifically, the computational device 116 may comprise, among other things, a caller ID module 120 that enables the computational device 116 to present User B with caller ID information associated with an incoming call or in-progress call occurring at the telephony device 108. In some embodiments, the telephony device 108 may have its own caller ID presentation mechanism; however, the computational device 116 may be configured to present the same caller ID information being presented by the telephony device 108 to accommodate specific presentation needs of User B. For instance, where the telephony device 108 may simply have an LED or LCD display that presents the caller ID information in a fixed size when an incoming call is received at the telephony device or while a communication session is in progress, the computational device 116 may leverage the caller ID module 120 to present the same caller ID information in an alternative format.

As one example, if User B has poor visual acuity, the received caller ID information could be presented in an enlarged high-contrast font on the display of the computational device 116. For example, in a Windows PC, the text could be presented appropriately on the screen. In an alternative embodiment, the text could be presented in an enlarged high-contrast font on the display of the computational device 116 and also presented by voice via the text-to-speech converter.

If User B has hearing impairments, then the incoming caller ID information could be presented via the computational device 108 as a highly animated screen pop that could attract a user's attention even if the user was not looking directly at the screen when the call arrived. Because the telephony device 108 is not equipped with the additional functionality of the computational device 116 (e.g., the telephony device 108 is a simpler device without a large screen, for example), the computational device 116, when used in concert with the telephony device 108, makes the telephony device 108 compliant with relevant accessibility statutes and regulations (e.g., Section 508 of the Standards for Electronic and Information Technology).

As will be discussed in further detail herein, the caller ID module 120 may be configured to work alone or in connection with another caller ID module 120 located at a remote server 124. Alternatively or additionally, functionality of the caller ID module 120 may be primarily implemented at the server 124 via the caller ID module 120 and alerting module 128 thereof and pushed to the computational device 116 such that no additional processing is required at the computational device 116 to determine the format with which caller ID information should be presented. In other words, some or all functionality of the caller ID module 120 may be implemented on the computational device 120, on the server 124, or on both the computational device 120 and server 124.

It is also important to note that while bi-directional arrows are shown between the computational device 116 and the communication network 104 and between the server 124 and the communication network 104, it may be desirable to limit the computational device's 116 ability to send any type of control command to the server 124. In particular, the computational device 116 may correspond to a pure consumer of data from the server 124 once it has provided the necessary address registration information to the server 124. Said another way, security concerns may dictate that the server 124 only sends messages and content to the computational device 116 after the computational device 116 has registered with the server 124. In some embodiments, a system administrator may know the address (e.g., MAC address, IP address, etc.) of the computational device 116 and may provision such information directly into the server 124, in which case the computational device 116 doesn't even send registration request information to the server 124.

Figure 2:
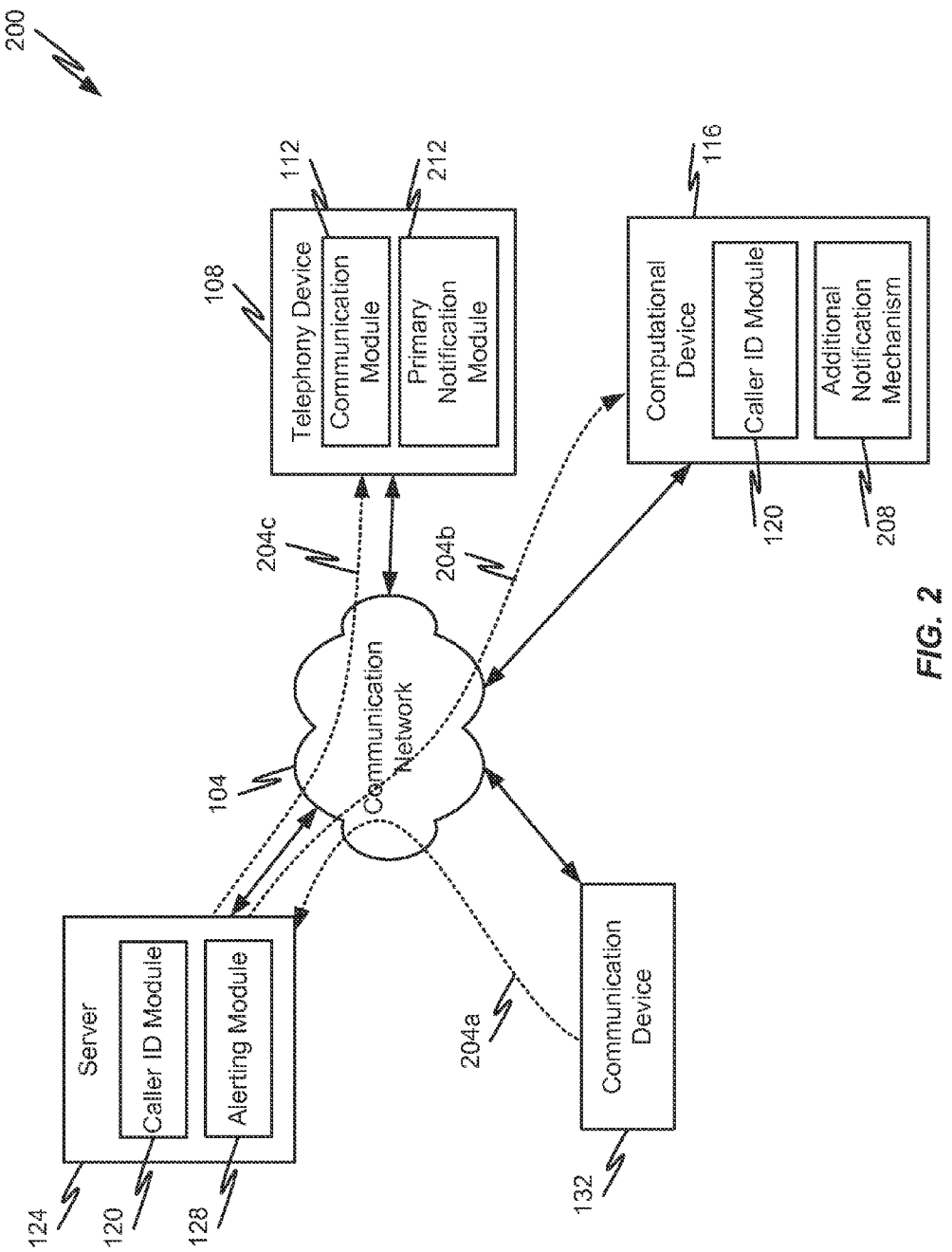
FIG. 2 is a flow diagram depicting a first possible flow of caller ID information through a communication system in accordance with embodiments of the present disclosure.

With reference now to FIG. 2, a first flow of caller ID information in the communication system 200 will be described in accordance with at least some embodiments of the present disclosure. The components of communication system 200 may be the same or similar to the components of system 100.

This particular call flow utilizes a call resolution technique referred to herein as parallel forking. In particular, the computational device 116 is allowed to register with the server 124 using the same Address of Record (AoR) as the telephony device 108. In some embodiments, an AoR actually corresponds to a user's alias (e.g., User B's AoR). Additional details of parallel forking and contact resolution are further described in U.S. Pat. No. 8,032,624 issued Oct. 4, 2011, to Brunson et al. and U.S. Patent Publication No. 2013/0301822, published Nov. 14, 2013, to Brunson, each of which are hereby incorporated by reference in their entirety. The basic premise of parallel forking is that multiple devices can register with the server 124 using the same AoR. When an incoming call is received at the server 124 and directed toward the shared AoR, the server 124 can utilize its altering module 128 to generate two alerting messages (e.g., fork the received alerting message), which are sent to both devices that have registered with the server 124 via the shared AoR.

Parallel forking can be alternatively or additionally employed to send the caller ID information to more than one telephony device 108 and/or computational device 116. For instance, a supervisor of User B may be enabled to receive caller ID information for calls directed to User B. Such a feature may be achieved by registering the supervisor's device using the same AoR as the telephony device 108. Alternatively or additionally, the supervisor may register with server 124 with his/her AoR and contact resolution performed at the server 124 may cause the INVITE and caller ID information contained therein (or just caller ID information) to be provided to the supervisor when User B is called.

In this illustrative flow, a call is initiated by communication device 132 and directed toward telephony device 108 (e.g., User A calls User B). In this example, the communication device 132 and/or telephony device 108 may correspond to SIP communication endpoints and when User A calls User B, the communication device 204a specifies the target/destination address as User B or an alias associated with User B (e.g., User B's AoR). This initial call-initiation request may be transmitted from the communication device 132 to the server 124 via a SIP INVITE message, where the INVITE message includes some identifier of User B or User B's telephony device 108 as a desired destination. The INVITE message may be transmitted in step 204a.

Upon receiving the INVITE message, the server 124 may utilize its alerting module 128 to perform contact resolution on the INVITE message. Specifically, the alerting module 128 may determine that both the telephony device 108 and the computational device 116 have registered with the server 124 using a shared AoR. This causes the alerting module 128 to generate two INVITE messages, one of which is sent to the computational device 116 (step 204b) and one of which is sent to the telephony device 108 (step 204c). When the telephony device 108 receives its INVITE message from the server 124, the telephony device 108 may generate a typical incoming call notification/alert (e.g., a flashing light, ring, etc.). The INVITE message may also contain caller ID information that identifies the calling user (e.g., User A) and/or the communication device 132 being utilized by the calling user.

This caller ID information may be presented in a typical fashion using the native hardware components of the telephony device 108 in the form of a primary notification module 212 (e.g., presentation via a small-format LCD or LED display where the size or presentation format of the caller ID information is well-suited for User B). Since the telephony device 108 is relatively simple and inexpensive, the presentation of the caller ID information may not be useful to User B, depending upon the needs of User B.

Accordingly, the computational device 116 is leveraged to also present caller ID information via its additional notification mechanism 208 (e.g., larger display, speakers, etc.). In some embodiments, the computational device 116 utilizes its caller ID module 120 to determine a desired format for presenting the caller ID information. Once properly formatted by the caller ID module 120, the additional notification mechanism 208 presents the caller ID information in the format more suitable and useable by User B. In this way, the relatively inexpensive telephony device 108 is made compliant with relevant accessibility regulations and statutes vis-à-vis utilization of the computational device 116.

Figure 3:
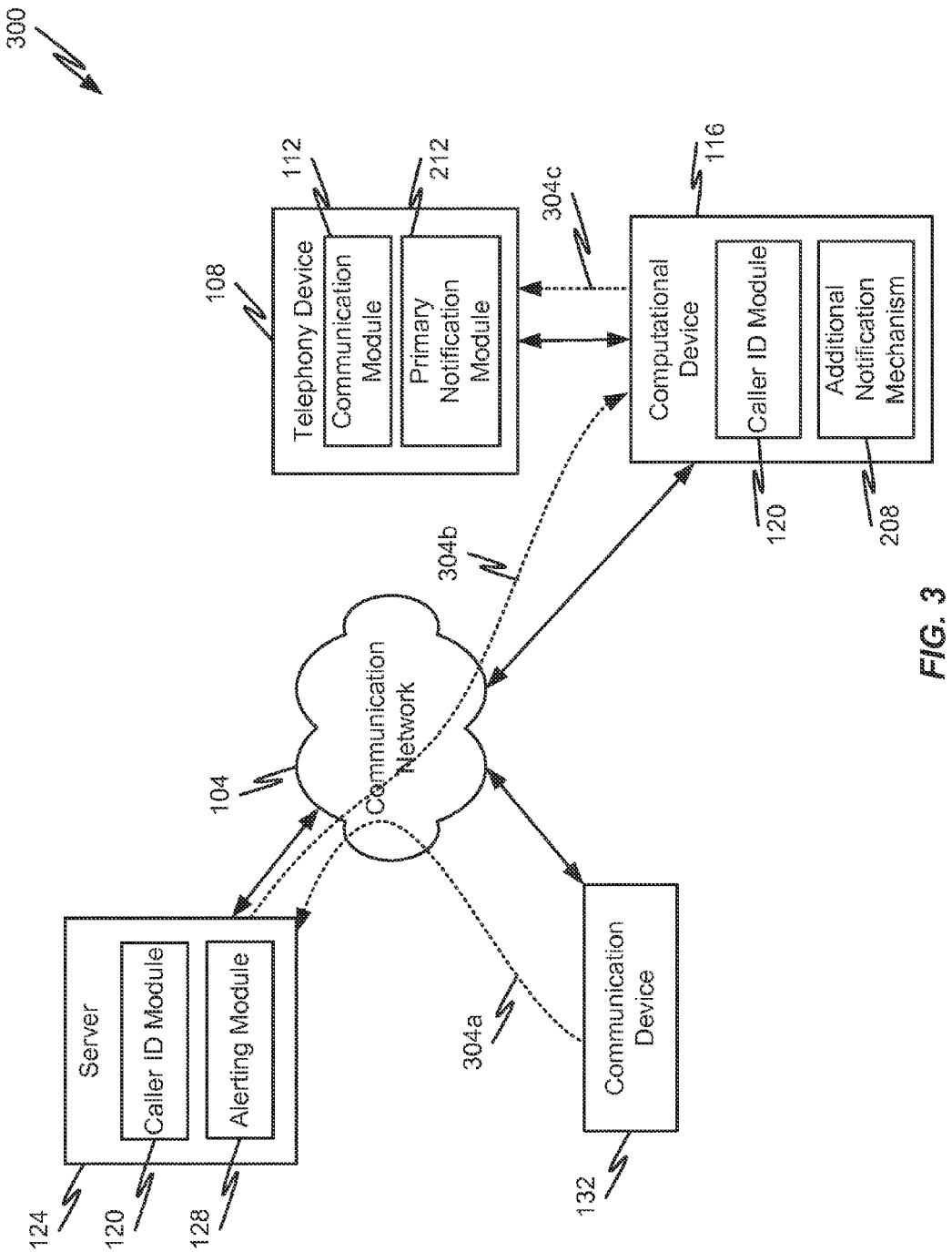
FIG. 3 is a flow diagram depicting a second possible flow of caller ID information through a communication system in accordance with embodiments of the present disclosure.

With reference now to FIG. 3, a second flow of caller ID information in the communication system 300 will be described in accordance with at least some embodiments of the present disclosure. The components of communication system 300 may be the same or similar to the components of system 100.

This particular flow of caller ID information does not utilize the parallel forking as described in connection with FIG. 2. Instead, the telephony device 108 registers with the server 124 through the computational device 116. In other words, the computational device 116 is daisy chained between the telephony device 108 and the server 124. In some embodiments, the computational device 116 may actively register with the server 124. For instance, the computational device 116 may comprise a soft client that registers with the server 124 on behalf of the telephony device 108. In some embodiments, the computational device 116 may not perform any registration with the server 124. Instead, the telephony device 108 may physically connect to the computational device 116 via a dedicated port and then utilize the network connection of the computational device 116 to connect with the server 124. In either event, the server 124 recognizes the port/IP address of the computational device 116 as a means for connecting with the telephony device 108 and a user thereof (e.g., User B).

The process begins when a call is initiated by a user via the communication device 132 (e.g., User A calls User B) (step 304a). Again, this call may be in the form of a SIP call in which case the communication device 132 transmits a SIP INVITE to the server 124. Upon receiving the INVITE message, the server 124 may resolve the address information for the called user and determine that the caller user (e.g., User B) is associated with telephony device 108. The alerting module 128 of server 124 may further determine that to route the INVITE message to the telephony device 108, the INVITE message may need to travel through the computational device 116. Accordingly, the process continues with the server 124 transmitting the INVITE message to the computational device 116 (step 304b).

When the computational device 116 receives the INVITE message, the computational device 116 may simply act as a passive device that allows the INVITE message to continue traveling to the telephony device 108 (step 304c). Upon receiving the INVITE message, the primary notification module 212 may present the caller ID information in addition to presenting other notifications of the incoming call.

In the meantime, the computational device 116 may have observed, copied, and/or scraped the caller ID information from the INVITE message as it was passing through to the telephony device 108. In some embodiments, the computational device 116 may not be allowed to alter or modify the INVITE message in any way as it passes to the telephony device 108. However, the computational device 116 may be allowed to copy or determine the caller ID information for itself so that it can utilize its additional notification mechanism 208 to present the caller ID information to the user in a better format than the primary notification module 212.

Figure 4:
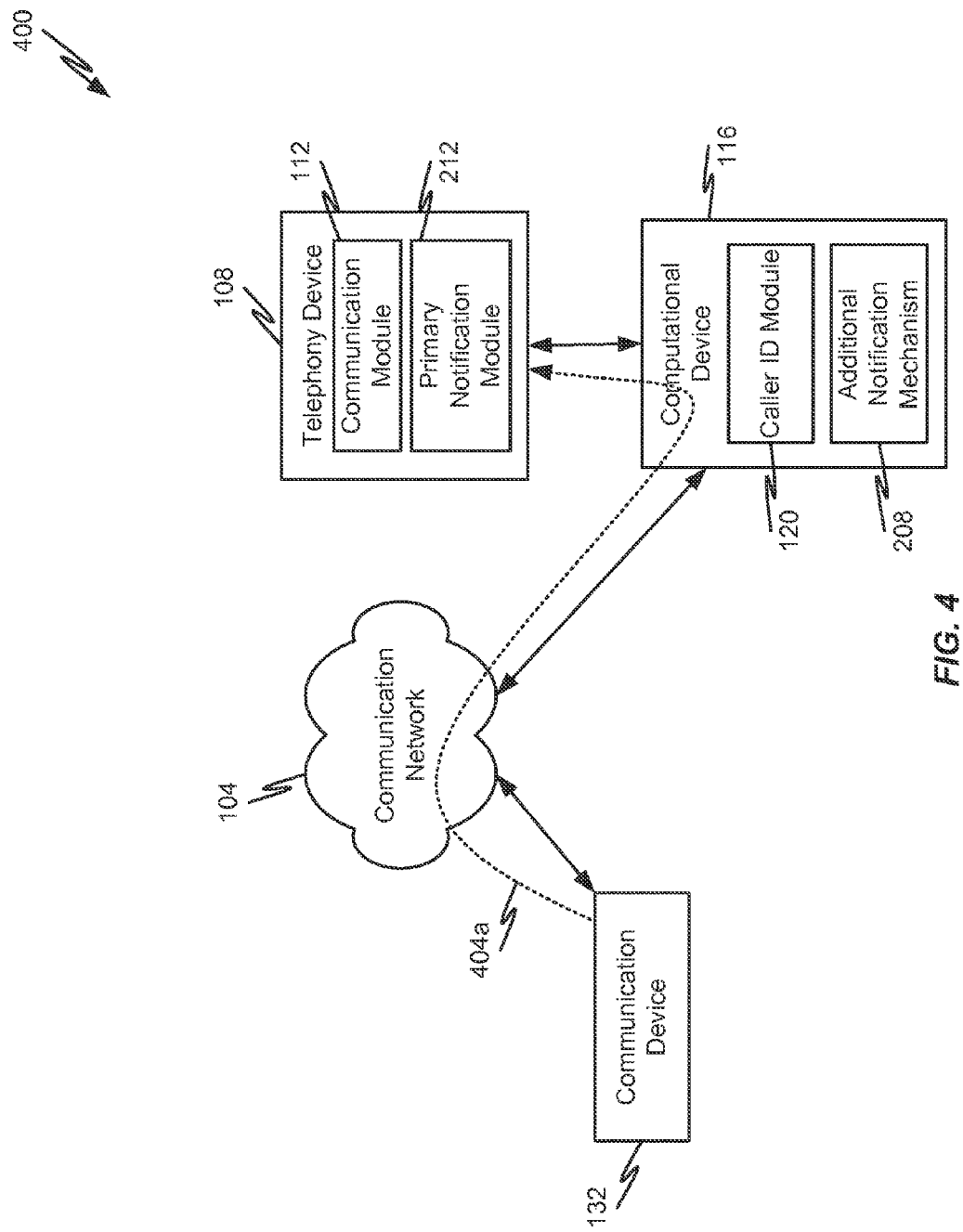
FIG. 4 is a flow diagram depicting a third possible flow of caller ID information through a communication system in accordance with embodiments of the present disclosure.

FIG. 4 depicts a third flow of caller ID information in the communication system 400 in accordance with at least some embodiments of the present disclosure. The components of communication system 400 may be the same or similar to the components of system 100.

This particular flow is similar to the flow of FIG. 3 except that no server 124 is used for contact resolution or routing of the call-initiation message. In this embodiment, the communication device 132 is allowed to send the call-initiation message through the communication network 104 to the computational device 116 without using a separate server 124 (step 404a). In this embodiment, the call-initiation message may not necessarily correspond to a SIP message. Instead, the call may correspond to a cellular call or some other non-SIP call that is directed to the telephony device 108 by the communication device 132 directly dialing a number associated with the telephony device 108. Similar to the flow in FIG. 3, the computational device 116 may passively observe the incoming call message sent in step 404a and determine caller ID information therefrom. Without performing any other processing on the message received from the communication device 132, the caller ID module 120 determines the caller ID information for the call and then presents the caller ID information via the additional notification mechanism 208.

Figure 5:
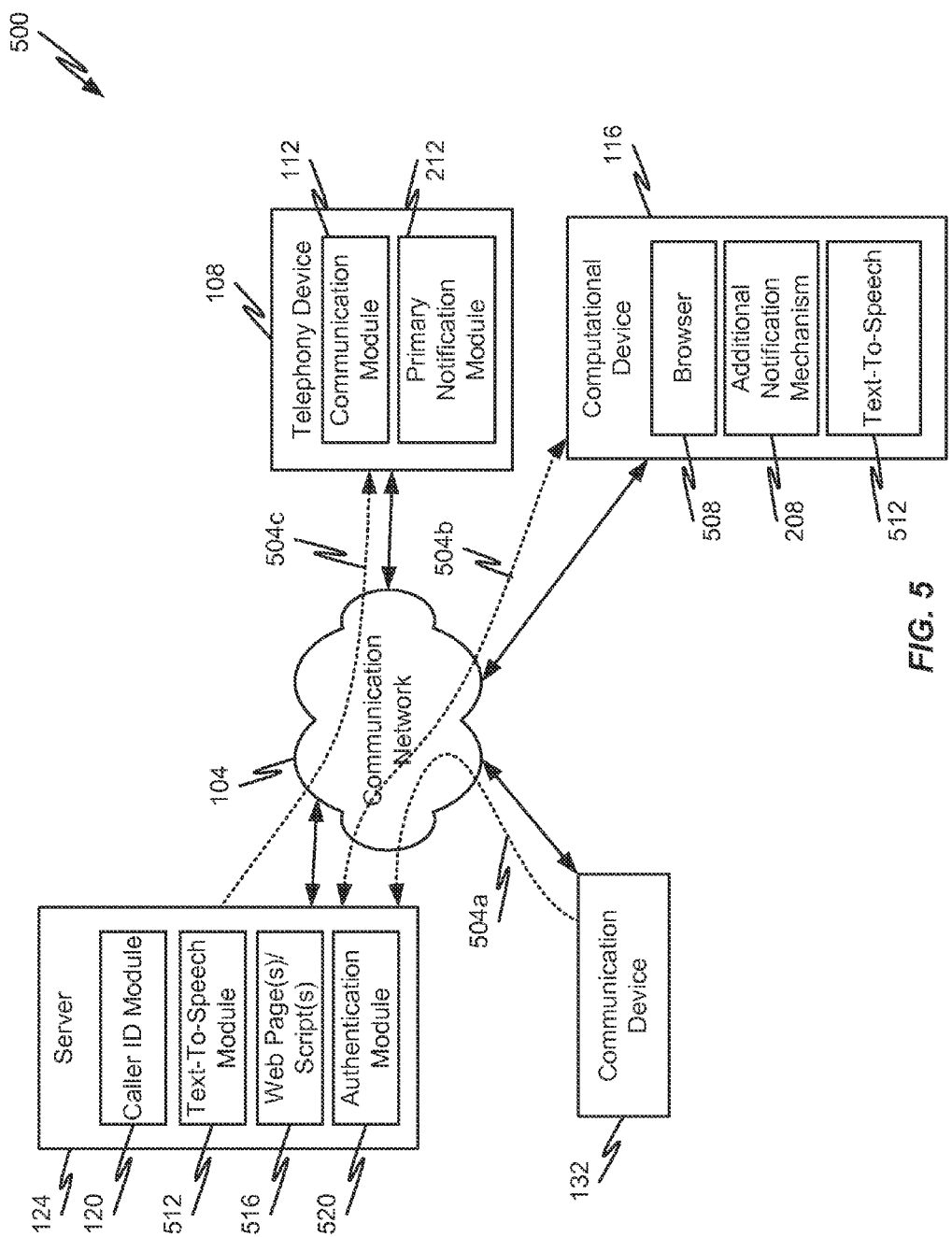
FIG. 5 is a flow diagram depicting a fourth possible flow of caller ID information through a communication system in accordance with embodiments of the present disclosure.

FIG. 5 depicts a fourth flow of caller ID information in the communication system 500 in accordance with at least some embodiments of the present disclosure. The components of communication system 500 may be the same or similar to the components of system 100.

In this depicted embodiment, the computational device 116 is equipped with a browser 508 and a text-to-speech module 512. The server 124 may also be provided with a text-to-speech module 512 as well as one or more web page(s) 516 and an authentication module 520. The computational device 116 may utilize its browser 508 to retrieve information from the server 124, potentially in the form of web page(s) and/or web scripts 516. In some embodiments, the computational device 116 may navigate its browser 508 to the web page(s) 516 by inputting a URL associated with the web page(s) 516 into a navigation bar of the browser 508. The server 124 may immediately provide the browser 508 with the requested web content or the server 124 may employ its authentication module 520 to require the user of the computational device 116 to authenticate with the server 124 (e.g., by inputting a user name and/or password). In other embodiments, the user of the telephony device 108 and computational device 116 may login to the server 124 via one of their devices (e.g., the telephony device 108) and in a known Single Sign On (SSO) fashion, the other device being used by the user may also be authenticated with the server 124. Thus, the user may only have to login to the server 124 once to have both of their devices registered and authenticated with the server 124. Once authenticated (or if no authentication is required), the server 124 may provide the web page(s) and/or scripts 516 to the browser 508.

The interaction between the browser 508 and server 124 may enable the computational device 116 to present caller ID information in synchronization with an incoming call directed toward the telephony device 108. In particular, when a call is initiated by the communication device 132 (step 504a), the server 124 may employ its caller ID module 120 to determine caller ID information associated with the incoming call. The call may be a SIP-based call, a web-based call (e.g., a call using Web Realtime Communications (WebRTC)) or the like. Upon determining caller ID information, the caller ID module 120 of the server 124 may update the web page(s) and/or scripts 516 to include the caller ID information. This caller ID information can be provided to the computational device 116 (step 504b) via appropriate Hyper Text Transport Protocol (HTTP) signaling and/or by embedding the caller ID information into the HTML document provided from the server 124 to the browser 508. Upon receiving the information from the server 124, the computational device 116 may utilize the browser 508 to present the caller ID information. Alternatively or additionally, the computational device 116 may utilize its text-to-speech module 512 to generate an audible form of the caller ID information for presentation to the user (e.g., User B). In other embodiment, the text-to-speech module 512 of the server 124 may generate the appropriate audible version of the caller ID information and provide instructions for rendering such information via the browser 508.

In this particular embodiment, the browser 508 may present the caller ID information via the additional notification mechanism 208 of the computational device 116 such that the user of the telephony device 108 and computational device 116 is able to perceive the caller ID information. In some embodiments, the server 124 may not be able to respond to anything more than GET requests issued by the browser 508. Any other form of communication may be ignored to ensure security of the server 124 and its various components.

While the caller ID information is being transmitted to the computational device 116, the server 124 may also be forwarding the original call-initiation message to the telephony device 108. In some embodiments, the telephony device 108 may utilize its primary notification module 212 to alert the user about the incoming call and/or present caller ID information to the user.

Referring now to FIGS. 6-9, various methods of providing caller ID information to a user will be described in accordance with at least some embodiments of the present disclosure. It should be appreciated that any portion of the following methods can be combined into a different method not explicitly described herein. For instance, certain steps from one method may be used in lieu of or in addition to other steps from another method. The following description is intended for illustrative purposes and should not be construed as limiting the claims to any particular embodiment.

Figure 6:
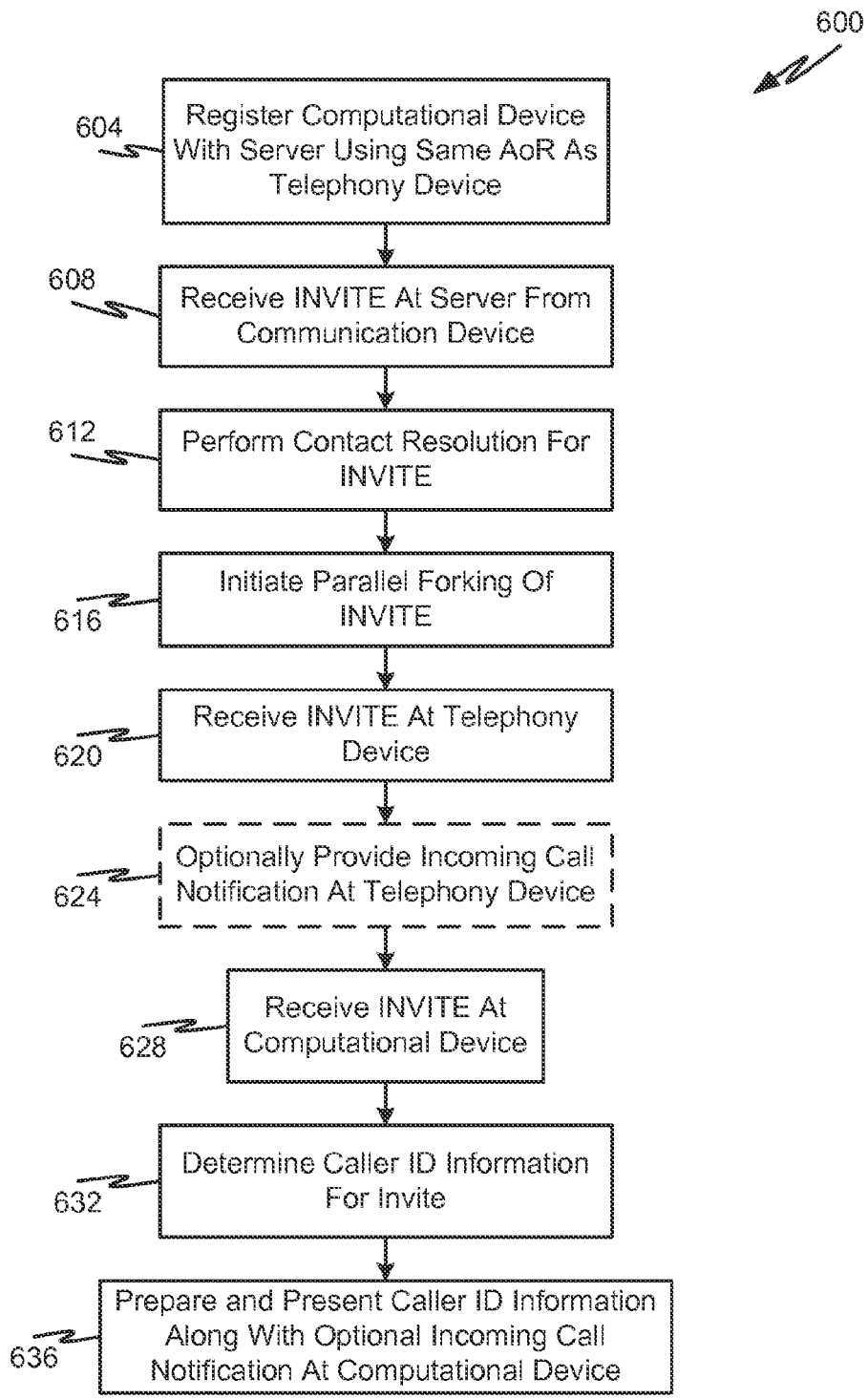
FIG. 6 is a diagram depicting a first process for providing caller ID information to a user in accordance with embodiments of the present disclosure.

With reference now to FIG. 6, a first method 600 of providing caller ID information to a user will be described in accordance with at least some embodiments of the present disclosure. The method 600 begins with a user registering their computational device 116 with a server 124 using the same AoR as was used to register their telephony device 108 with the server 124 (step 604). At this point, multiple devices are registered with the server 124 via a common AoR.

Thereafter, the server 124 receives an INVITE message from a calling communication device 132 (step 608). The INVITE message in this example is directed toward the AoR of the user simultaneously using the telephony device 108 and computational device 116. The server 124 responds to this input by performing contact resolution for the INVITE message (step 612) and determining that more than one device needs to be alerted in response to receiving the INVITE message by sending two INVITE messages to each device of the user (step 616).

When the INVITE message is received at the telephony device 108 (step 620), notification of the incoming call may be provided optionally via the primary notification module 212 (step 624). The incoming call notification may or may not include a presentation of caller ID information.

Before, after, or simultaneous with steps 620 and 624, the computational device 116 may receive its INVITE message (step 628), determine caller ID information for the message (step 632), and then prepare/present caller ID information to the user (step 636). The caller ID information can be provided to the user via the additional notification mechanism 208.

Figure 7:
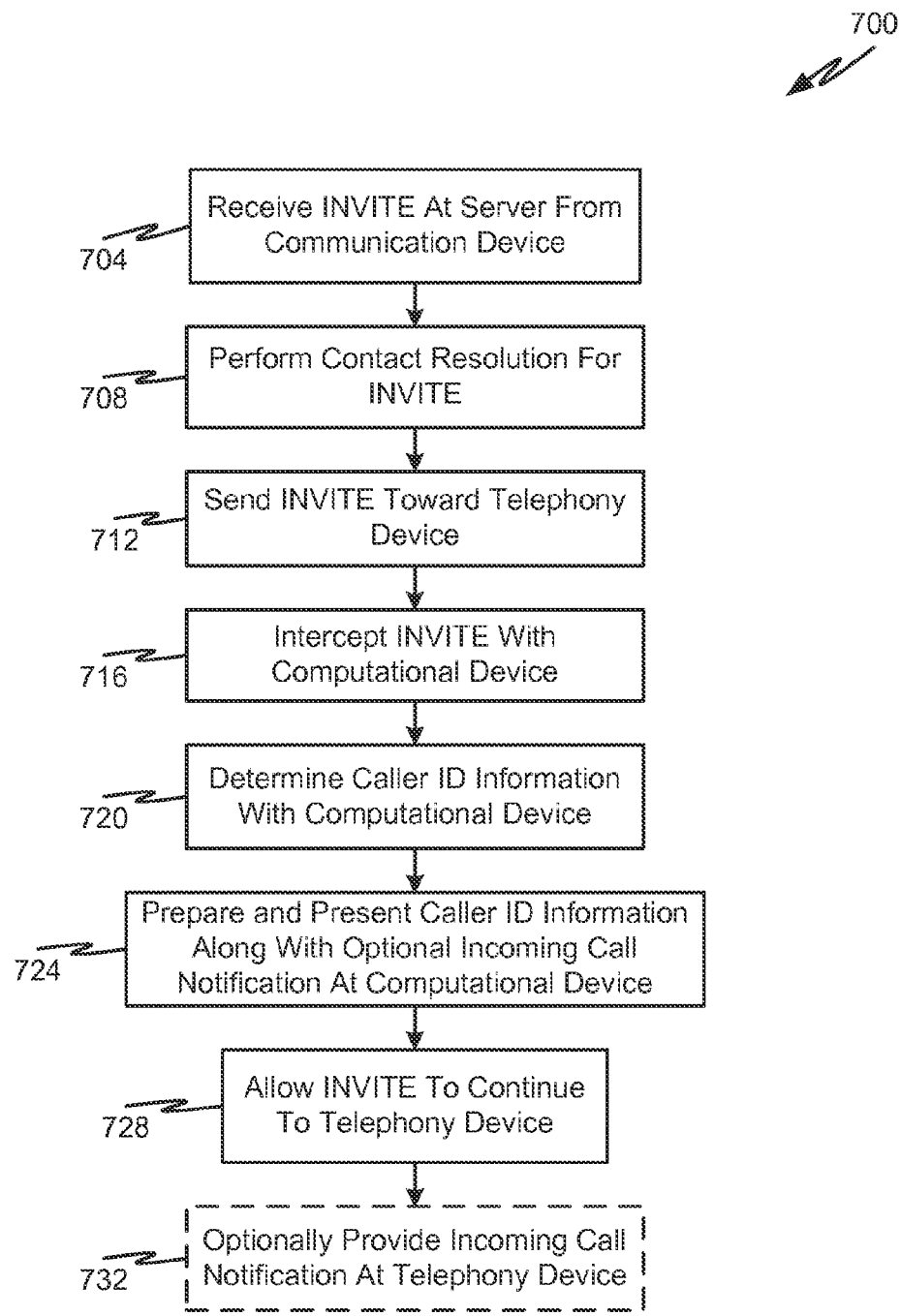
FIG. 7 is a diagram depicting a second process for providing caller ID information to a user in accordance with embodiments of the present disclosure.

With reference now to FIG. 7, a second method 700 of providing caller ID information to a user will be described in accordance with at least some embodiments of the present disclosure. The method 700 begins with a server 124 receiving an INVITE message from a calling communication device 132 (step 704). The method continues with the server 124 performing contact resolution for the INVITE message (step 708). In some embodiments, the contact resolution may be performed by referencing an internally-maintained list of users and call resolution preferences for such user (e.g., a call resolution table). During contact resolution the server 124 may identify the telephony device 108 as the target for the INVITE message. Accordingly, the INVITE message is transmitted toward the telephony device 108 (step 716).

On its way to the telephony device 108, the INVITE message may be intercepted or observed by the computational device 116 (step 716). The computational device 116 may allow the INVITE message to continue to the telephony device (step 728); however, during its inspection of the INVITE message the computational device 116 may determine caller ID information associated with the message (step 720) and present such caller ID information to the user of the computational device 116 and telephony device 108 via the additional notification mechanism 208 (step 724).

When the telephony device 108 receives the INVITE message, the telephony device 108 may optionally provide an incoming call notification and/or caller ID information via the primary notification module 212 (step 732).

Figure 8:
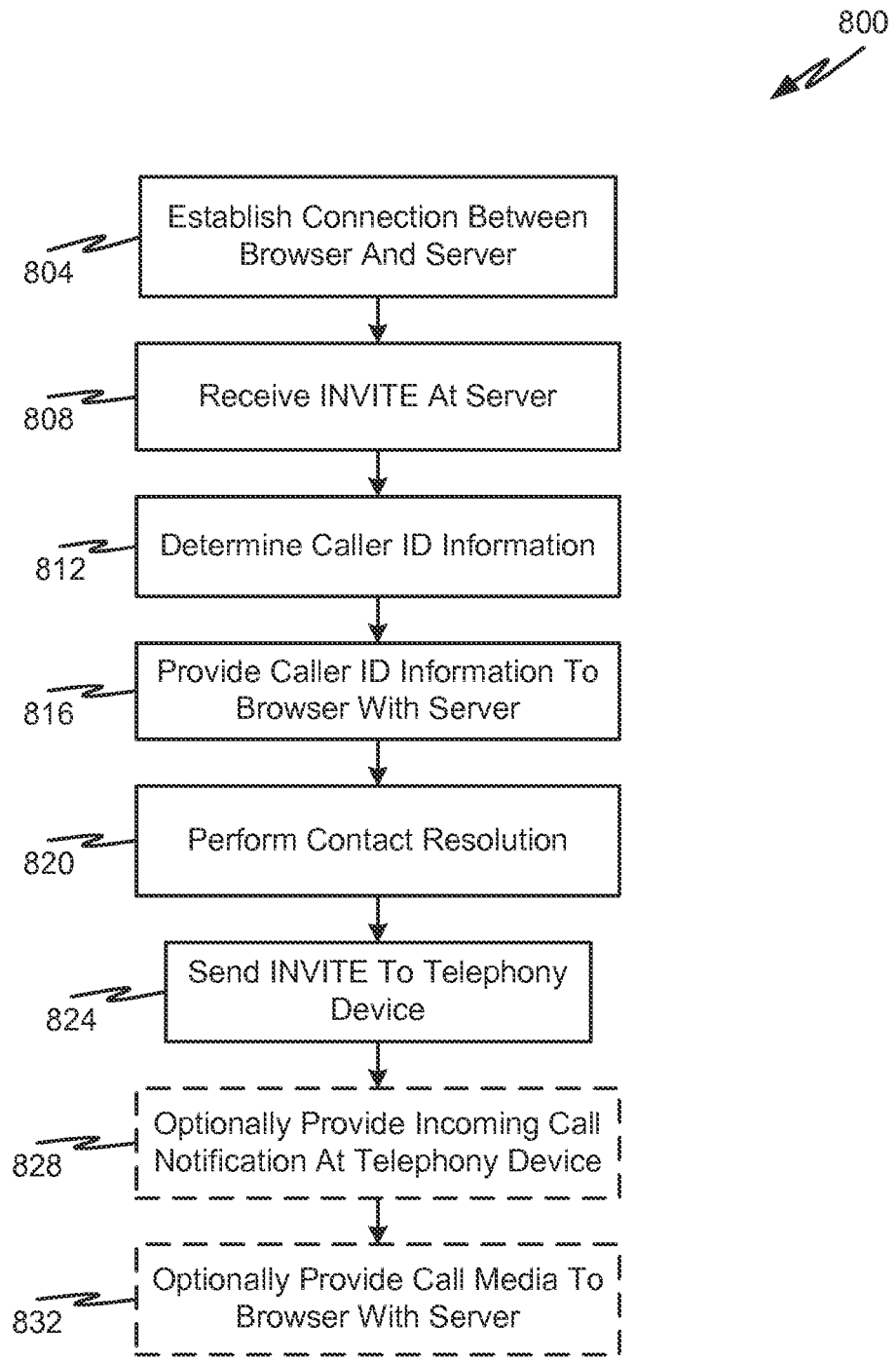
FIG. 8 is a diagram depicting a third process for providing caller ID information to a user in accordance with embodiments of the present disclosure.

With reference now to FIG. 8, a third method 800 of providing caller ID information to a user will be described in accordance with at least some embodiments of the present disclosure. The method 800 begins with a computational device 116 establishing a connection/session with a server 124 (step 804). In particular, a user may direct a browser 508 of the computational device 116 to the server 124 such that the server 124 is able to provide web page(s) and/or scripts 516 to the browser 508. In some embodiments, the connection/session may not be secured, in which case authentication may be optional. In some embodiments, the connection/session may be secured, in which case authentication via the authentication module 520 may be required by the server 124.

After the connection/session has been established between the computational device 116 and server 124, the method continues when a call-initiation message is received at the server 124 (step 808). In response thereto the server 124 may determine caller ID information from the message (step 812) and provide the caller ID information to the computational device 116 via the web page(s) and/or scripts 516 (step 816). In some embodiments, the caller ID information may be embedded into a web page served to the browser 508 and displayed via the additional notification mechanism 208. In some embodiments, the caller ID information may be input into an executable that is referenced by the web page such that a predetermined portion of the web page is enabled to present the caller ID information. In some embodiments, the caller ID information is converted from text to speech and audibly rendered by a speaker of the computational device 116 in response to the caller ID information being included in the web page.

Before, after, or simultaneous with the computational device 116 presenting the caller ID information, the server 124 may also perform contact resolution for the received call-initiation message (step 820) and send the message to the telephony device 108 in response to the contact resolution (step 824).

When the telephony device receives the incoming call-initiation message, the telephony device 108 may optionally present the caller ID information (step 828). Alternatively or additionally, some of the call media may be provided to the browser 508 via the server 124 since a session has been established therebetween (step 832). In other words, the communication channel used to carry caller ID information to the browser 508 may also be utilized to carry some or all of the media exchanged between the calling user (e.g., User A) and the called user (e.g., User B).

Figure 9:
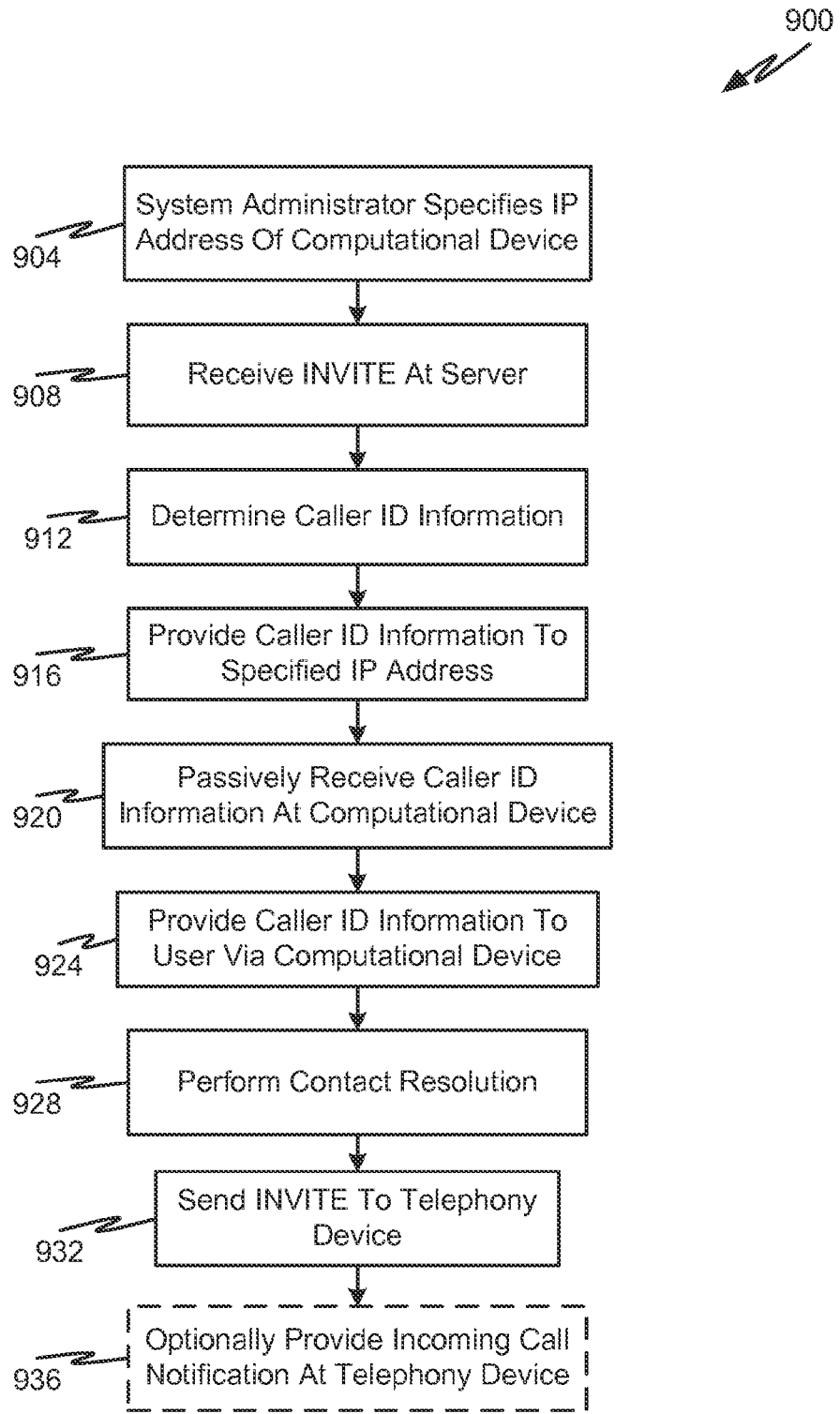
FIG. 9 is a diagram depicting a fourth process for providing caller ID information to a user in accordance with embodiments of the present disclosure.

With reference now to FIG. 9, a fourth method 900 of providing caller ID information to a user will be described in accordance with at least some embodiments of the present disclosure. The method 900 begins with a system administrator specifying an IP address for a target computational device 116 that is to be associated with a predetermined telephony device 108 (step 904). In other words, a system administrator may manually provision the server 124 to associate a particular computational device 116 with a particular telephony device 108 such that when a call is received at the server 124 and is directed toward the particular telephony device 108, the server 124 knows that the associated particular computational device 116 is to receive caller ID information for that call. Such a provisioning enables the system administrator to maintain security over the system and limit the computational device 116 to only receiving caller ID information from the server 124. The computational device 116 does not provide any control or messages back to the server 124 and is, therefore, passively receiving information from the server 124.

In addition to provisioning the IP address for the computational device 116, the system administrator may provision the server 124 with other information. As an example, the system administrator could customize how caller ID information (or any other call-related information) is provided from the server 124 to a computational device 116 (or telephony device 108). As a non-limiting example, the system administrator may provision the server 124 to deliver voice packets to the computational device 116 of a blind user whereas large-font text messages are sent to a computational device 116 of a low-vision user. As another example, the system administrator may provision the server 124 to flash a display of a deaf user's computational device 116. The provisioning can be done on a per-user basis or the system administrator may define behaviors for the server 124 based on a particular disability and if a user registers with the server 124 as having that particular disability, then the server 124 will automatically apply the provisioned behaviors to calls for that registered user.

Once the server 124 is properly provisioned, the method 900 continues when the server 124 receives an incoming call-initiation message (e.g., an INVITE message) (step 908). The server 124 then determined caller ID information from the message (step 912) and provides the caller ID information to the IP address that was specified by the system administrator during provisioning (step 916).

The computational device 116 passively receives the caller ID information (step 920) and presents the caller ID information to the user in a format that is suited for the user (step 924). Meanwhile, the server 124 also performs contact resolution on the received message (step 928) and identifies the telephony device 108 that is being used by the target user. The server 124 then sends the message to the telephony device 108 (step 932), which can optionally provide an independent notification of the incoming call and/or caller ID information (step 936).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A caller identification and notification adjunct executed with a computational device, the computational device comprising:
   a user interface that presents information to a user of the computational device;
   a processor that prepares information for presentation to the user via the user interface; and
   computer memory comprising processor-executable instructions that include:
      a caller identification module that passively receives caller identification information for a call directed toward a telephony device being operated by the user simultaneous with the computational device; and
      an additional notification mechanism that: prepares the caller identification information passively received at the caller identification module according to instructions received from a server such that accessibility needs of the user are accommodated by the user interface during presentation of the caller identification information to the user, the caller identification information forwarded via SIP (Session Initiation Protocol) messages to: the computational device based on the instructions received from the server and another device based on different instructions received from the server, and
         presents, via SIP, other notifications of the call.

2. The computational device of claim 1, wherein the instructions received from the server define that the caller identification information is to be presented in an enlarged high-contrast font and wherein the additional notification mechanism prepares the caller identification information for presentation by the user interface in the enlarged high-contrast font.

3. The computational device of claim 1, wherein the instructions received from the server define that the caller identification information is to be presented in an audible format an wherein the additional notification mechanism prepares the caller identification information of presentation by the user interface in the audible format.

4. The computational device of claim 1, wherein the caller identification information is received at the caller identification module via a call-initiation message.

5. The computational device of claim 4, wherein the call-initiation message comprises a Session Initiation Protocol (SIP) INVITE message.

6. The computational device of claim 5, wherein the SIP INVITE message corresponds to a message that is not received at the telephony device.

7. The computational device of claim 4, wherein the call-initiation message is received at the computational device in response to the computational device registering with the server using at least one of an Internet Protocol (IP) address of the computational device and Address of Record (AoR) associated with the user.

8. The computational device of claim 1, wherein the computer memory further comprises a browser that is configured to establish a session with a server and receive the caller identification information via at least one of a web page and a script embedded into a web page.

9. The computational device of claim 8, wherein the computer memory further comprises a text-to-speech module that converts the caller identification information from the at least one of a web page and a script into an audible format for presentation by the user interface.

10. The computational device of claim 1, wherein the user interface comprises a display screen.

11. The computational device of claim 1, wherein the user interface comprises a speaker.

12. A communication system, comprising:
   a server that receives a call-initiation message from a communication device, determines that the call-initiation message is directed toward a user operating a telephony device, and further determines that the user is also operating a computational device, wherein the server obtains caller identification information from the call-initiation message and then provides the caller identification information and other notification of the call to the computational device along with instructions for presenting the caller identification information such that the computational device is enabled to present the caller identification information to the user at least substantially simultaneous with the call-initiation message being received at the telephony device and in accordance with the instructions received from the server, the caller identification information forwarded via SIP (Session Initiation Protocol) messages to: the computational device based on the instructions received from the server and another device based on different instructions received from the server.

13. The system of claim 12, wherein the server further comprises a contact resolution table that enables the server to perform contact resolution for the call-initiation message and, in response thereto, transmit the call-initiation message to the telephony device as well as provide the caller identification information to the computational device.

14. The system of claim 13, wherein the caller identification information is provided to the computational device in a Session Initiation Protocol (SIP) message.

15. The system of claim 14, wherein the call-initiation message transmitted to the telephony device also comprises a SIP message that is transmitted substantially simultaneous with the SIP message transmitted to the computational device.

16. The system of claim 12, wherein the server further comprises a web server configured to provide one or more web pages to the computational device, wherein the one or more web pages provide the caller identification information to the telephony device.

17. The system of claim 16, wherein the server further comprises an authentication module that requires the user of the computational device to provide a valid user name and password prior to the web server providing the one or more web pages to the computational device.

18. The system of claim 12, wherein the server further comprises a text-to-speech module configured to convert a text-based representation of the caller identification information into a speech-based representation of the caller identification information and then serve the speech-based representation of the caller identification information to the computational device for presentation to the user.

19. The server of claim 12, wherein the server is provisioned with an address of the computational device and wherein the server provides the caller identification information to the computational device without receiving any signaling from the computational device.

20. A method of enabling presenting caller identification information to a user of a telephony device, wherein the user comprises a special accessibility requirement, the method comprising:
   receiving a call-initiation message at a server, wherein the call-initiation message is received from a calling user and is directed toward the user with the special accessibility requirement;
   performing a contact resolution process on the call-initiation message to determine that the telephony device is to receive the call-initiation message;
   during the contact resolution process, further determining that a second call-initiation message is to be provided to a computational device operated by the user with a special accessibility requirement; simultaneously sending the call-initiation message to the telephony device and the second call-initiation message to the computational device so that the computational device is enabled to present the user with caller identification information and other notifications of the call in a format that accommodates the special accessibility requirements of the user while the telephony device also alerts in response to receiving the call-initiation message, the caller identification information forwarded via SIP (Session Initiation Protocol) messages to: the computational device based on the instructions received from the server and another device based on different instructions received from server.

* * * * *

UNITED STATES PATENT AND TRADEMARK OFFICE
CERTIFICATE OF CORRECTION

| | | |
|---|---|---|
| PATENT NO. | : 9,215,316 B1 | Page 1 of 1 |
| APPLICATION NO. | : 14/524899 | |
| DATED | : December 15, 2015 | |
| INVENTOR(S) | : Paul Roller Michaelis et al. | |

It is certified that error appears in the above-identified patent and that said Letters Patent is hereby corrected as shown below:

In The Claims

At Column 16, line 21, please delete "notification" and replace it with --notifications-- therein.

At Column 17, line 29, after "from" add --the-- therein.

Signed and Sealed this
Fifteenth Day of March, 2016

Michelle K. Lee
*Director of the United States Patent and Trademark Office*